United States Patent
Huebner et al.

(10) Patent No.: US 9,120,426 B1
(45) Date of Patent: Sep. 1, 2015

(54) WHEELHOUSE CLADDING STEP

(71) Applicant: Ford Global Technologies, LLC, Dearborn, MI (US)

(72) Inventors: Annette Lynn Huebner, White Lake, MI (US); Artur Sakarian, Birmingham, MI (US); Ryan Welch, Ottawa Lake, MI (US); Kristin Ann Hellman, Walled Lake, MI (US); Matt Rutman, Howell, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/174,961

(22) Filed: Feb. 7, 2014

(51) Int. Cl.
*B60R 3/02* (2006.01)

(52) U.S. Cl.
CPC .......................................... *B60R 3/02* (2013.01)

(58) Field of Classification Search
CPC ............ B60R 3/00; B60R 3/002; B60R 3/02; B60R 2019/002; B60J 11/10; B62D 25/16; B62D 25/22; B62D 25/182
USPC ............. 296/198, 1.07, 1.08; 280/163, 164.1, 280/166
See application file for complete search history.

(56) References Cited

U.S. PATENT DOCUMENTS

| | | | |
|---|---|---|---|
| 3,171,671 A * | 3/1965 | Cornett ......................... | 280/163 |
| 5,238,268 A * | 8/1993 | Logan .......................... | 280/848 |
| 5,456,479 A | 10/1995 | Conger | |
| 5,538,265 A * | 7/1996 | Chen et al. ..................... | 280/163 |
| 5,697,644 A * | 12/1997 | Logan et al. .................. | 280/848 |
| 6,179,312 B1 * | 1/2001 | Paschke et al. ............... | 280/166 |
| 6,264,222 B1 * | 7/2001 | Johnston et al. .............. | 280/166 |
| 6,533,303 B1 * | 3/2003 | Watson ......................... | 280/166 |
| 6,676,223 B2 | 1/2004 | Kolpasky | |
| 7,118,150 B2 * | 10/2006 | Bruford et al. ............... | 296/37.1 |
| 7,413,205 B2 | 8/2008 | Watson | |
| 7,416,232 B2 | 8/2008 | Tier et al. | |
| 7,431,118 B1 * | 10/2008 | Hogg ............................ | 180/219 |
| 8,011,681 B2 | 9/2011 | Plavetich | |
| 2005/0006870 A1 * | 1/2005 | Williams ....................... | 280/166 |
| 2005/0073163 A1 * | 4/2005 | Luetze et al. ................ | 296/1.08 |
| 2010/0301580 A1 * | 12/2010 | Stahl et al. .................... | 280/166 |
| 2012/0098231 A1 * | 4/2012 | Huotari et al. ................ | 280/166 |
| 2012/0104721 A1 * | 5/2012 | Genest et al. ................. | 280/166 |

OTHER PUBLICATIONS

RoofBag.com, "RoofBag Tire Step", 3 pages.

* cited by examiner

*Primary Examiner* — Gregory Blankenship

(74) *Attorney, Agent, or Firm* — Jason Rogers; Bejin Bieneman PLC

(57) ABSTRACT

A wheelhouse cladding step assembly includes a step movable between a closed position and an open or deployed position in which the step is located proximal the wheelhouse of the vehicle and provides improved access to the roof and/or rooftop cargo storage of the vehicle. The step is designed to have a shape matching the shape of the wheelhouse of the vehicle and is preferably curved and when in the closed position shows a surface that matches the vehicle trim to hide the step. The assembly includes hinges and a latching mechanism that are also contained within the assembly so they are hidden when the step is in the closed position.

20 Claims, 4 Drawing Sheets

WHEELHOUSE CLADDING STEP

BACKGROUND

The present disclosure generally relates to vehicles and, more particularly, relates to a step for a vehicle to improve accessibility to, and usefulness of, the roof area and a roof rack cargo storage system.

Users of vehicles, including in particular sport utility and crossover type vehicles, often desire access to the roof of the vehicle and/or upper portions of their vehicle for a variety of reasons such as cleaning the full vehicle exterior (including the windshield, moon roof, and entire vehicle roof), as well as using the roof rack and/or top of vehicle storage area. While some individuals may use of the side vehicle running board and/or rear bumper for these purposes, it is not be possible to use the side running boards to access some of the areas of the roof of the vehicle since they do not provide users enough increased reach to gain access to the primary storage area of the roof of the vehicle. It is generally known to use a step or wheel ladder or other similar device to gain access to the upper portion of the vehicle. However, such solutions are limited and can be quite inconvenient and cumbersome—particularly when the devices or tools must be brought along and stowed in the vehicle when access to the roof is desired at another location. Obviously, such devices may be forgotten or lost. When ladders or other such devices are not available, it is generally known that the user may also attempt to access the roof/upper portions of the vehicle by standing on the tires, the vehicle interior floor and the vehicle seats (with the door open). These actions may result in awkward body positions and in an increased potential for vehicle and/or cargo damage. Despite these long known solutions and their limitations and deficiencies, the generally known solutions remain unchanged. There long remains a significant need to improve the accessibility to the roof areas of a vehicle, in particular the cargo storage area.

DRAWINGS

DETAILED DESCRIPTION

Figure 1:
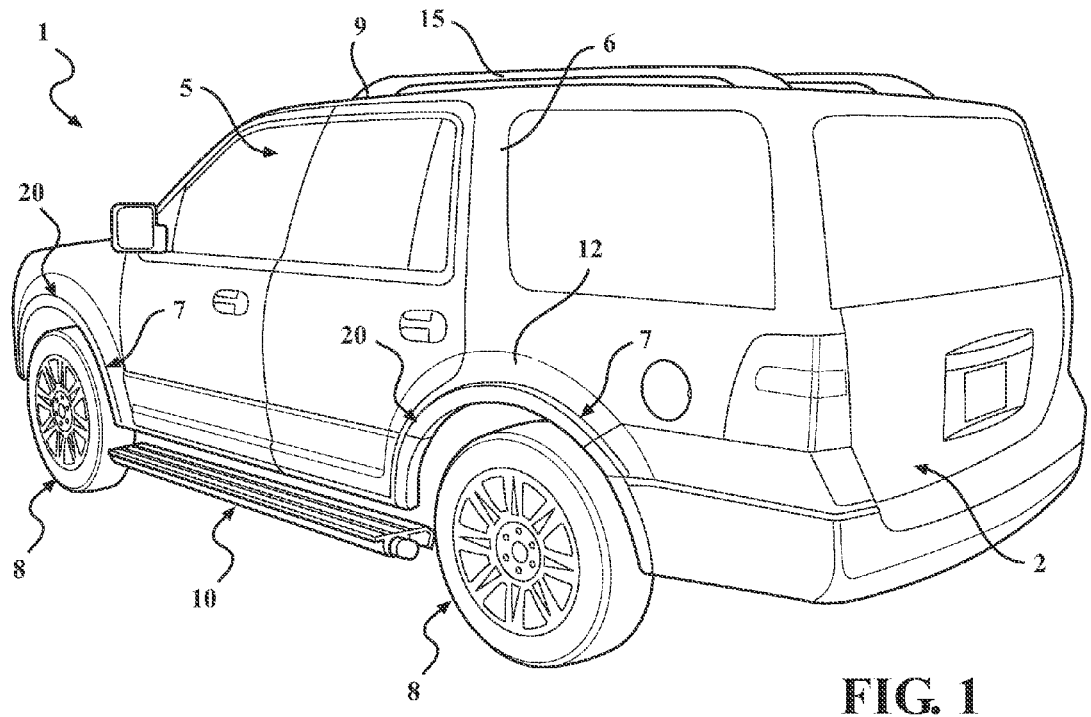
FIG. 1 is a perspective, graphic view of a sport utility vehicle including a deployable, wheelhouse cladding step in a closed position according to an exemplary embodiment of the present disclosure.
Figure 2:
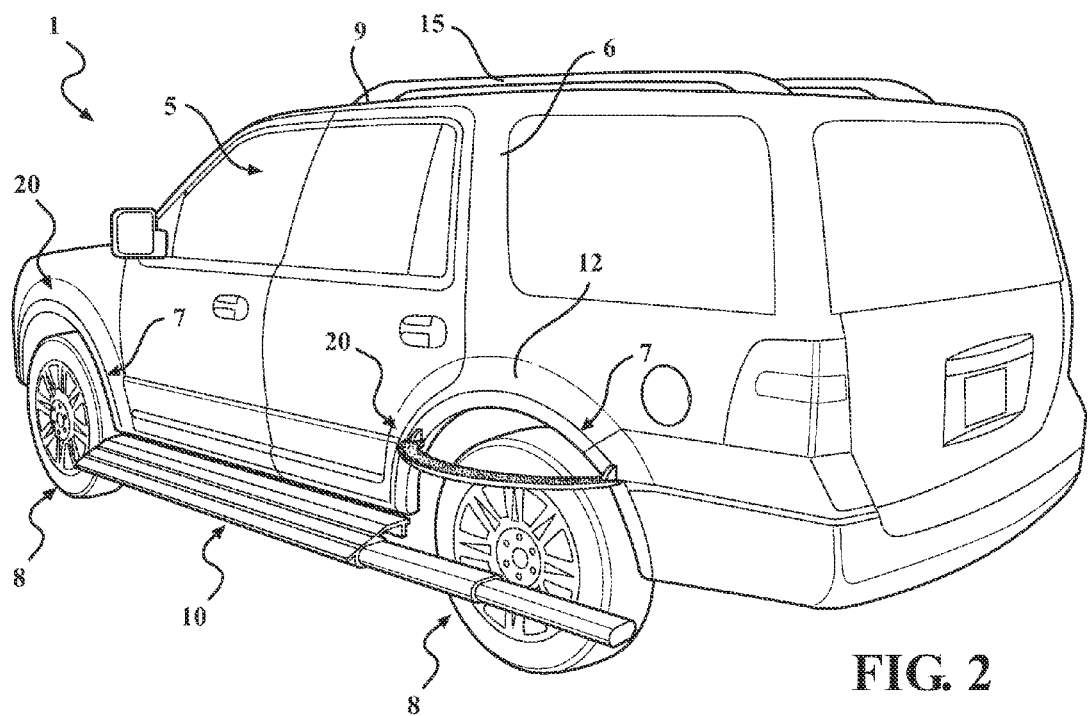
FIG. 2 is a perspective, graphic view of the sport utility vehicle including the deployable, wheelhouse cladding step in an open position according to the exemplary embodiment of FIG. 1.
Figure 3:
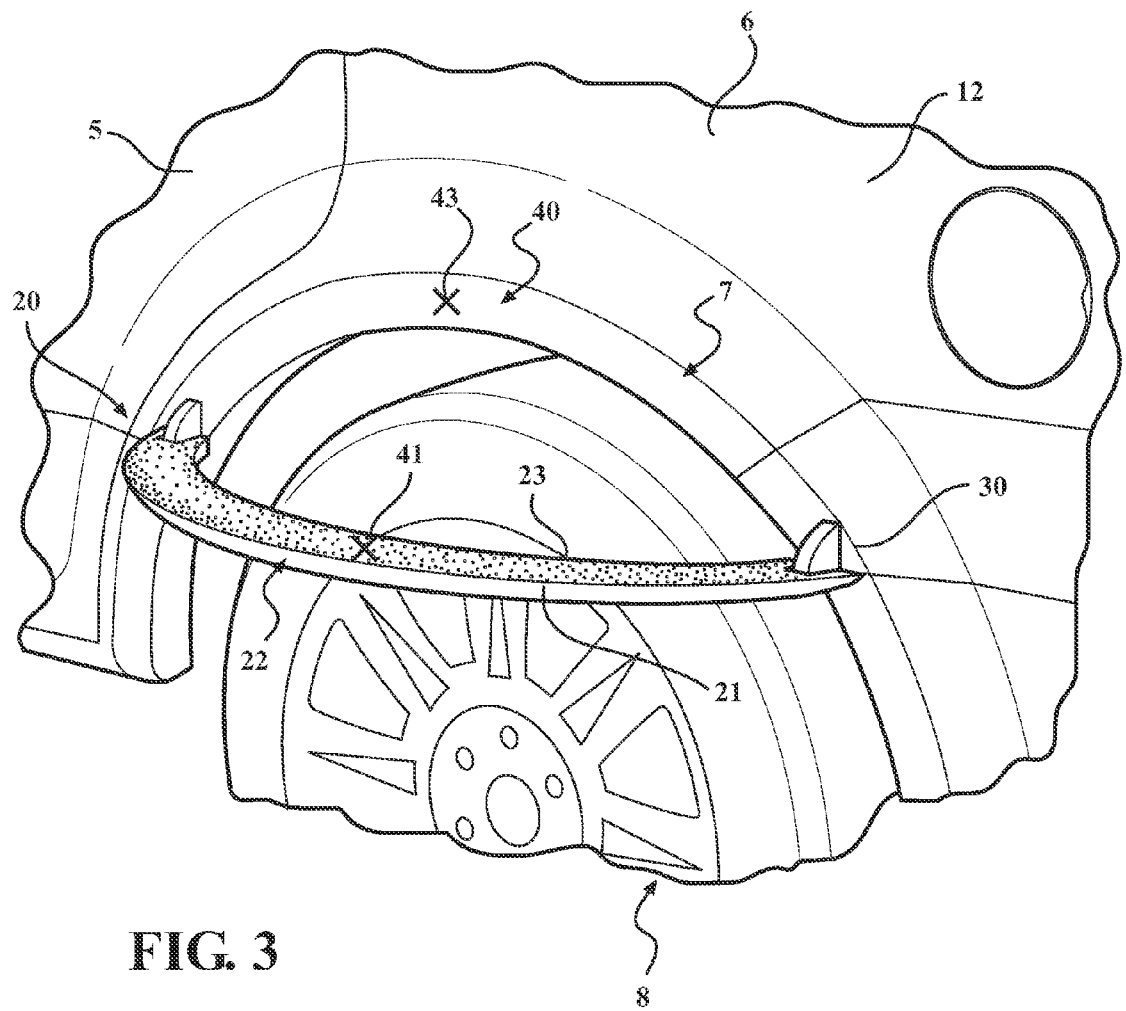
FIG. 3 is an alternate perspective, graphic view of the sport utility vehicle including the deployable, wheelhouse cladding step in an open position according to the exemplary embodiment of FIG. 1.

Referring in general to all of the Figures and in particular to FIGS. 1 through 3, there is disclosed a wheelhouse cladding step 20 installed on a vehicle 1 according to an exemplary embodiment of the present disclosure. The vehicle 1 shown in the present disclosure is a sport utility type vehicle. The vehicle 1 includes a rear end 2 including a liftgate 3 and a cab or occupant or passenger compartment 5 as are generally known. The vehicle 1 may further include sides 6, wheel wells or wheelhouses 7, and wheels 8 as are generally known. In one particular exemplary embodiment of the present disclosure, the vehicle 1 may further include a side step or running board 10 for assisting an occupant in entering and exiting the cab 5 of the vehicle 1. In a further particular exemplary embodiment of the present disclosure, the side step 10 may include a deployable extension 11 as best shown in FIG. 2.

The vehicle 1 further includes a roof or top 9 generally extending over the cab or occupant portion 5 of the vehicle 1. The roof 9 of the vehicle 1 may further include a cargo or roof rack storage system 15 or similar devices and/or apparatuses. The cargo storage rack 15 may be factory installed as original equipment or it may alternatively be an aftermarket installed product. The wheelhouse cladding step 20 of the present disclosure may be used with any known type passenger, commercial or cargo wheeled vehicle 1 including wheelhouses 7, particularly where there is a need and/or desire by a user to have convenient and improved access to the roof 9 of the vehicle 1 and support while accessing and using the roof rack storage system 15 on the roof 9 of the vehicle 1. For purpose of illustration, the implementation of the wheelhouse cladding step 20 of the present disclosure is shown only on the driver's side 6 rear wheelhouse 7. The wheelhouse cladding step 20 of the present disclosure may be used at any and/or each wheelhouse 7 of the vehicle 1. The body sides 6 of the vehicle 1 may generally extend downward from the roof 9 and may include a body or side panel 12 having a class A surface having a requisite fit and finish. Each body panel 12 may further include a body finishing component, proximal the wheelhouse 7, in the form of the wheelhouse cladding step 20 to be located in a wheelhouse cladding recess 13 in the body panel 12. The wheelhouse cladding recess 13 of the panel 12 may be modified (as compared to the non-step wheelhouse version where only a wheelhouse trim strip is provided) to create more space to better accommodate the wheelhouse cladding step 20 and its components according to the present disclosure. In particular, in one exemplary embodiment, the additional space and functionality of the wheelhouse cladding recess 13 may include a latching mechanism 40 for selectively and securely coupling a step or step member 22 of the wheelhouse cladding step 20 to the body panel 12 or other structure of the vehicle 1.

The step member 22 may preferably have a generally semi-circular or curvilinear shape. More particularly, the step member 22 may preferably have a shape corresponding or matching the shape of the wheelhouse cladding recess 13 located along the upper periphery of the wheelhouse 7 of the vehicle 1. In one exemplary embodiment of the present disclosure, the shape and design appearance details of the step member 22 may preferably be selected to closely match and blend with the shapes and design appearances of the panel 12 and the side 6 of the vehicle 1 and its related other trim and components. The outer surface 21 of the step 22 may be designed to appear as a class A exterior trim/ornamental piece such that the wheelhouse cladding step 20 may be visually indistinguishable, as reasonably as possible, from the traditional wheelhouse cladding trim member not including a step. The step member 22 may further include an inner or stepping surface or member 23 preferably including a surface having a non-skid material, function (e.g., a treaded surface) to provide proper, convenient and safe usage as a step to access the roof 9 and/or cargo storage 15 of the vehicle 1.

The step 22 of the wheelhouse cladding step 20 may be movable to and from a first closed position (as best shown in FIG. 1) in which the inner stepping surface 23 is located in the wheelhouse cladding recess 13 of the vehicle 1 proximal the wheelhouse 7 and wherein the outer or finish surface 21 generally covers or closes the wheelhouse cladding recess 13 to provide a generally class A finish to the panel 12 of the body side 6 of the vehicle 1. The step 22 of the wheelhouse cladding step 20 may be movable to and from a second step or open position (as best shown in FIG. 2) in which the inner stepping surface 23 is not located in the wheelhouse cladding recess 13 but is aligned generally horizontally aligned with and facing away from the ground (i.e., generally upward) under the vehicle 1 and wherein the outer or finish surface 21 is generally horizontally aligned and facing toward the ground under the vehicle 1 and no longer covers or closes the wheelhouse cladding recess 13. In the second step position of FIGS. 2 and 3, the step 22 is usable for supporting an individual at an elevated position from the ground and closer to the roof and/or cargo storage 15 located on the roof 9.

Referring now in particular to FIGS. 2 and 3, the wheelhouse cladding step 20 may include hinges 30 for coupling the step 22 to the side 6 of the vehicle 1. A first hinge 30 may be located proximal one end of the wheelhouse cladding recess 13 and a second hinge 30 may be located proximal the other end of the wheelhouse cladding recess 13. The first and second hinges 30 may preferably be located and/or coupled proximal the ends of the step 22 but may alternatively be coupled more distal and in other locations as may be appropriate for incorporating the wheelhouse cladding step 20 into the side 6 of the vehicle 1. The hinges 30 may be located on the side 6 of the vehicle 1 proximal the wheelhouse 7 of the vehicle. More particularly, the hinges 30 may be located proximal the lower ends or corners of the wheelhouse cladding recess 13 which may contain passages or openings for receiving each hinge when the step 22 is in the closed position. The hinges 30 may be of any known or appropriate construction for folding down and up, as well as locking, the step 22 between the first and second positions.

Referring still to FIGS. 2 and 3, the wheelhouse cladding step 20 may also include a latching mechanism 40 for selectively coupling or latching the step 22 to the side 6 of the vehicle 1 in the closed position. The latching mechanism 40 may preferably function to selectively latch the step 22 to the wheelhouse recess 13 of the vehicle 1 when the step 22 is in the first closed position (as shown in FIG. 1) and the latching mechanism 40 may preferably be operated for releasing the step 22 from the wheelhouse recess 13 to be moved to the second deployed position (as shown in FIG. 2).

In one particular exemplary embodiment of the present disclosure, to latch, lock, secure and/or couple the wheelhouse cladding step 22 to the panel 12 when not in use and to have a flush appearance with the body side 6 of the vehicle 1, the wheelhouse recess panel 12 may include a male portion 41 of a retention clip latching mechanism 40 (or, alternatively, multiple male portions of multiple retention clips 40) and the female portion 43 (such as a sprung or biased side recess) of the retention clip latching mechanism 40 may be located at a corresponding location on the step 22 for retaining the step 22 in the closed position as shown in FIG. 1.

The wheelhouse cladding step 20 may be designed to support a user at an elevated level to provide improved access to the roof 9 and storage rack 15 located on the top of vehicle 1 as well as to more easily clean the entirety of the roof 9 of the vehicle 1. The wheelhouse cladding step 20 of the present disclosure transforms the exterior cladding located proximal the wheelhouse 7 from a purely cosmetic styling element of the vehicle 1 to a functional fold down step 22. The wheelhouse cladding step 20 may be used by itself or, alternatively, in combination with the side running board or step 10 as well as in conjunction with the extension 11 of the side step 10 to provide improved access to the roof 9, the cargo rack storage system 15 and other upper portions of the vehicle 1.

Referring now in particular FIGS. 4-7, there is disclosed a wheelhouse cladding step 120 installed on a vehicle 1 according to an alternate exemplary embodiment of the present disclosure. The wheelhouse cladding step 120 may be installed on any vehicle 1 and generally includes a similar design as well as features and functions as the wheelhouse cladding step 20 of FIGS. 1-3. Accordingly, the present description is limited to the comparative differences embodied in the wheelhouse cladding step 120 of FIGS. 4-7. The wheelhouse cladding step 120 includes a unique hinge 130 including a damper, dashpot or spring mechanism 160 for use in providing at least a balancing force during movement of the wheelhouse cladding step 120. The wheelhouse cladding step 120 may include a step member 122 that may include a step member 122 the may preferably have a generally semi-circular or curvilinear shape. More particularly, the step member 122 may also preferably have a shape corresponding or matching the shape of the wheelhouse cladding recess 13 located along the upper periphery of the wheelhouse 7 of the vehicle 1. In the present exemplary embodiment of the present disclosure, the shape and design appearance details of the step member 122 may also preferably be selected to closely match and blend with the shapes and design appearances of the panel 12 of the side 6 of the vehicle 1 and its related other trim and components. The step member 122 may also include an outer surface 121 designed to appear as a class A exterior trim/ornamental piece such that the wheelhouse cladding step 120 that may be as visually indistinguishable as reasonably as possible from the traditional wheelhouse cladding trim member not including a step. The step member 122 may further include an inner or stepping surface or member 123 preferably including a surface having a non-skid material, function (e.g., a treaded surface) to provide proper, convenient and safe usage as a step to access the roof 9 and/or cargo storage 15 of the vehicle 1.

Figure 4:
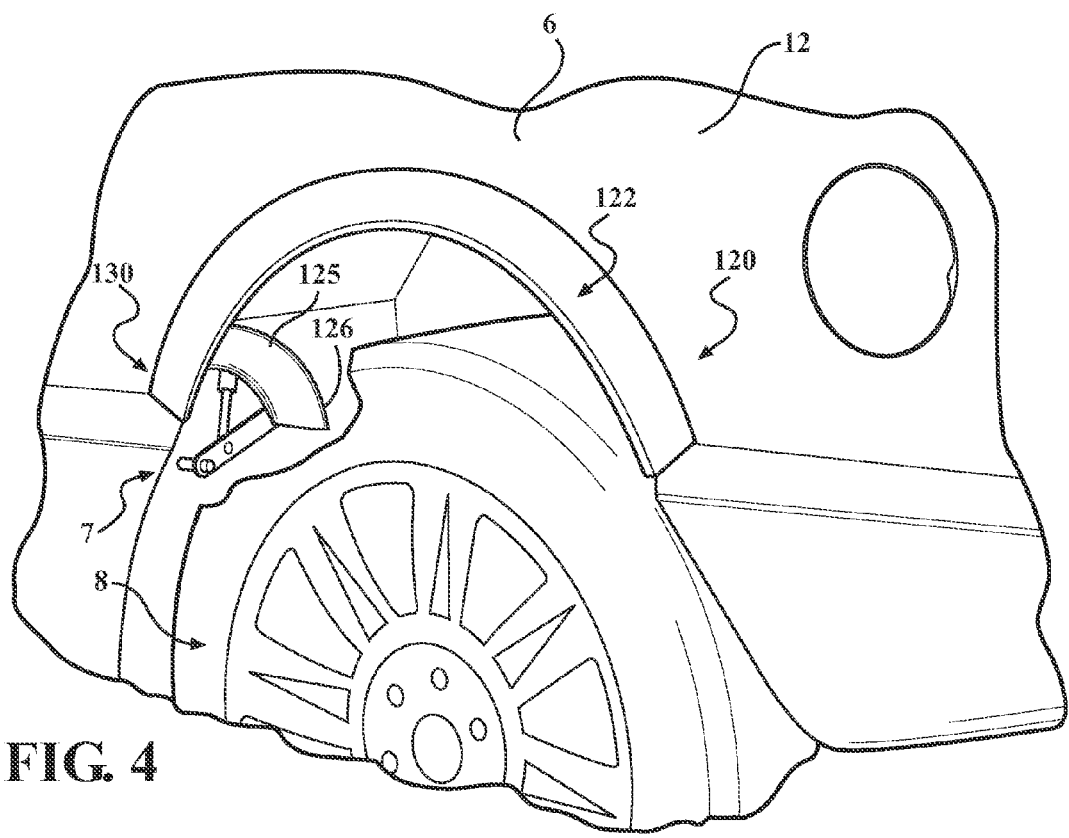
FIG. 4 is a perspective, graphic view of a vehicle including a deployable, wheelhouse cladding step according to an alternate exemplary embodiment of FIG. 1.
Figure 5:
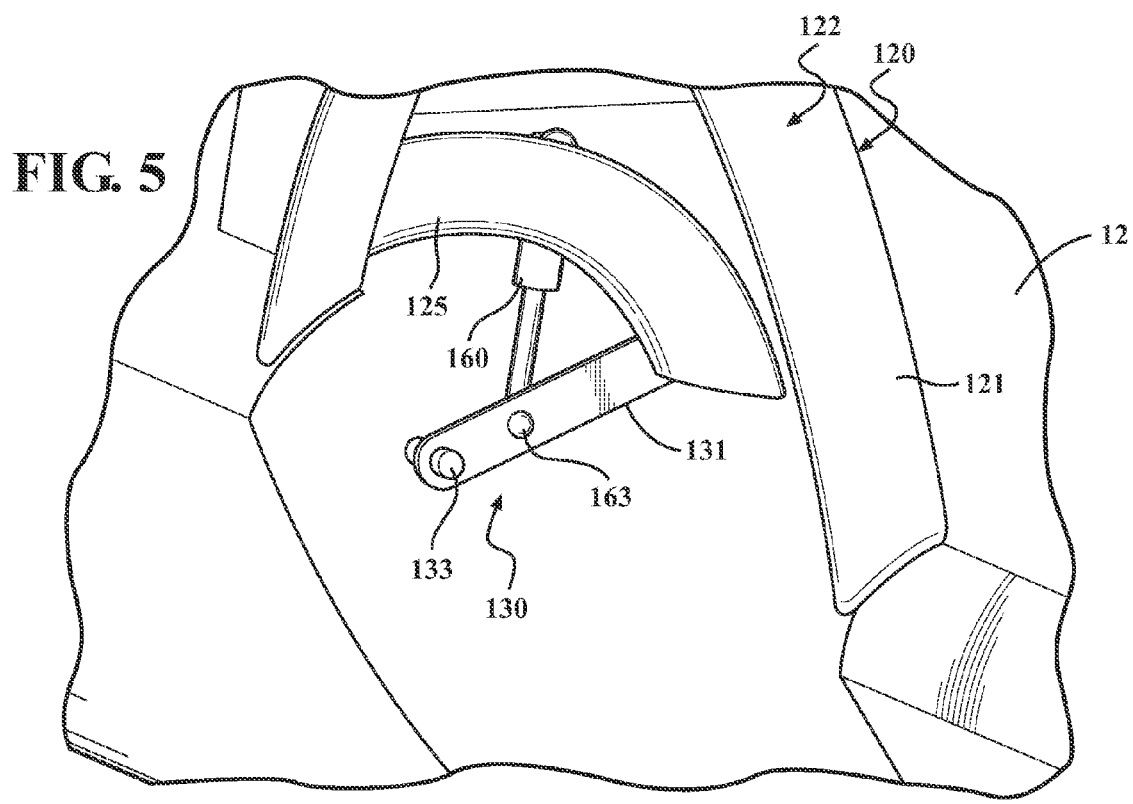
FIG. 5 is an alternate perspective, graphic view of the deployable, wheelhouse cladding step in a closed position according to the alternate exemplary embodiment of FIG. 4.
Figure 6:
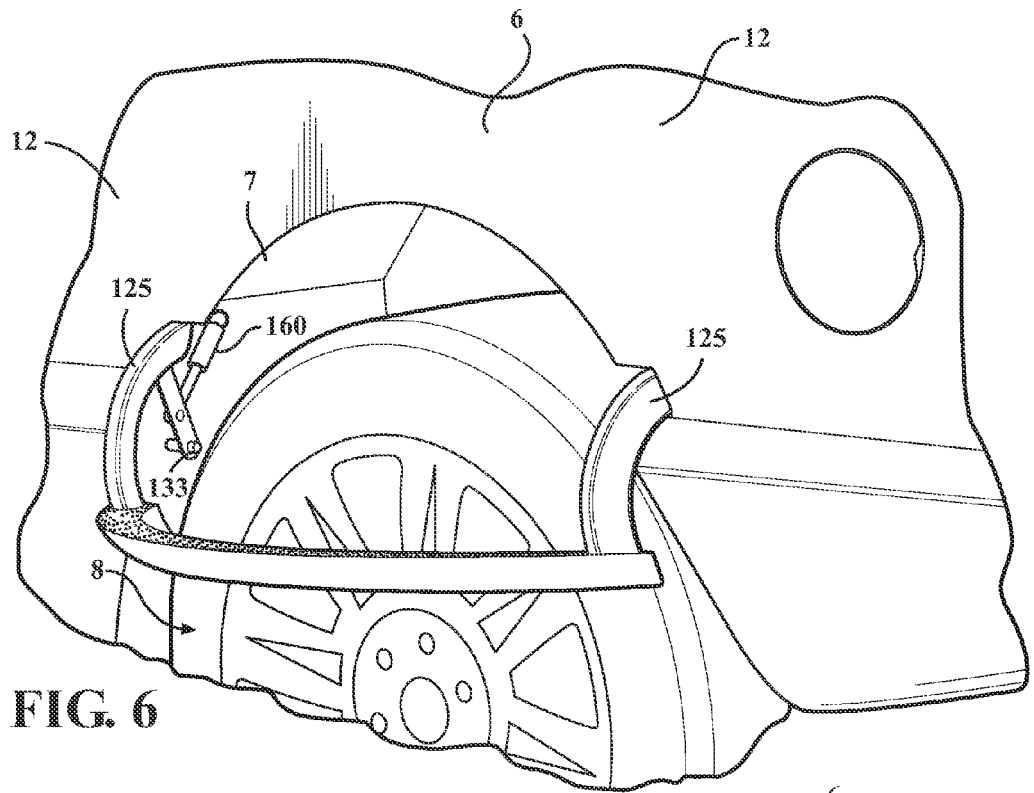
FIG. 6 is an alternate perspective, graphic view of the deployable, wheelhouse cladding step in an open position according to the alternate exemplary embodiment of FIG. 4.
Figure 7:
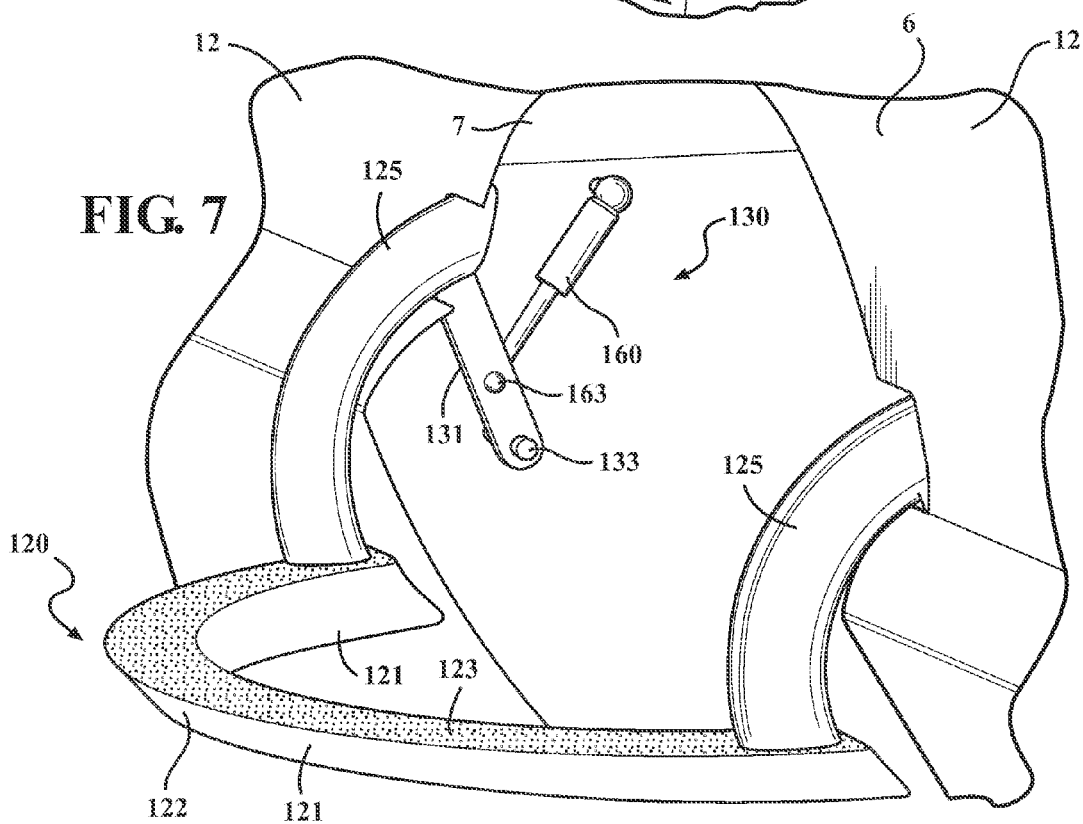
FIG. 7 is an alternate perspective, graphic view the deployable, wheelhouse cladding step in an open position according to the exemplary embodiment of FIG. 4.

The step 122 of the wheelhouse cladding step 120 may be movable to and from the first closed position as shown in FIGS. 4 and 5 and wherein the outer or finish surface 121 generally covers or closes the wheelhouse cladding recess 13 to provide the class A finish to the panel 12 of the body side 6 of the vehicle 1. The step 122 of the wheelhouse cladding step 20 may be movable to and from the second or open position as best shown in FIGS. 6 and 7 in which the stepping surface 123 is located generally horizontal to the vehicle 1 and is aligned with and facing away from the ground (i.e., generally upward) and wherein the outer or finish surface 121 is generally horizontally aligned with and facing toward the ground. In the second step position of FIGS. 6 and 7, the step 122 is usable for supporting an individual at an elevated position from the ground and closer to the roof and/or cargo storage 15 located on the roof 9.

Referring still in particular to the alternate exemplary embodiment of FIGS. 4 through 7, the step 122 may include first and second extension members 125 that are integrated and/or made unitary with the step 122. Each extension member 125 is located proximal a respective end of the step 122 and generally extends arcuately from the inner side 123 of the step 122 as best shown in FIGS. 6 and 7. The extension member 125 may pass through a hole or passage in the side 6 of the vehicle 1 proximal the side of the wheelhouse 7 or may be located within the wheelhouse 7. A distal end of the extension member 125 may include an expanded portion or end 126 for limiting movement of the step 122 at the second position as shown in FIGS. 6 and 7 and for transferring forces applied to the step member 122 to the vehicle 1.

As noted above, the hinges 130 couple or connect the step 122 to the vehicle 1 at the wheelhouse 7 of the vehicle 1. A first hinge mechanism 130 may be located proximal one end of the wheelhouse 7 and a second hinge mechanism 130 may be located proximal the other end of the wheelhouse 7. The first and second hinges 130 may preferably be located and/or coupled proximal the distal ends of the extension members 125 of the step 22 but may alternatively be coupled in other locations as may be appropriate for incorporating the wheelhouse cladding step 120 into the vehicle 1. In the alternate exemplary embodiment of FIGS. 4 through 7, each hinge 130 of the wheelhouse cladding step 120 may preferably further include a link member 131 having a first end coupled or otherwise connected proximal the end 126 of the extension member 125 and a second end pivotably coupled to a post or coupling member 133 that may be fixed or coupled to the vehicle 1 such as to a component of the frame of the vehicle 1. The post 133 may be coupled, integrated or made unitary into any of the frame, wheelhouse 7 or vehicle 1 in any known or appropriate design. In one alternate exemplary embodiment, the distal end of the link member 131 may preferably be pivotably coupled to the post 133 so that the post 133 may function as the pivot point the step member 122.

As noted above, each hinge 130 may further include a spring mechanism 160 having a first or input end 163 coupled to a point between the proximal and distal ends of the link member 131 as best shown in FIGS. 5 and 7. The spring mechanism 160 may preferably be a damped strut type device and may be, alternatively, any one of a compression, extension, or torsion spring(s) which accomplishes the objective to provide a limiting and/or biasing force against the movement of the step 122. When the step member 122 is in the first or closed position (FIGS. 4 and 5), the spring mechanism 160 provides a biasing force against the movement of the step member away from the first position which helps to maintain the step member 122 in that position, in addition to, or in place of, any step latching mechanism 40. Similarly, when the step member 122 is in the second or open position (FIGS. 6 and 7), the spring mechanism 160 provides a biasing force against the movement of the step member away from the second position which helps to maintain the step member 122 in that position while it is in use as a step. The other end of the spring mechanism 160 may be coupled, integrated or made unitary into any of the frame, wheelhouse 7 or vehicle 1 in any known or appropriate design.

The present description is intended to be illustrative and not restrictive. Many embodiments as well as many applications besides the exemplary embodiments provided will be apparent to those of ordinary skill in the relevant art upon understanding the present disclosure. The scope of the claimed invention should not be determined with limiting reference to the description but should instead be determined with reference to the appended claims along with the full scope of equivalents to which such claims are entitled. Any disclosure of an article or reference, including patent applications and publications, is incorporated by reference herein for all purposes. Any omission in the claims of any aspect of subject matter disclosed herein is not a disclaimer of such subject matter.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless expressly stated, all ranges are intended to include both endpoints and all numbers between the endpoints. The use of "generally," "about" or "approximately", or similar words, in connection with a range applies to both ends of the range. Thus, "about 20 to 30" is intended to cover "about 20 to about 30", inclusive of at least the specified endpoints.

The disclosure of "a" or "one" to describe an element, ingredient, component or step is not intended to foreclose additional elements, ingredients, components or steps. Plural elements, ingredients, components or steps may be provided by a single integrated element, ingredient, component or step. Alternatively, a single integrated element, ingredient, component or step may include separate plural elements, ingredients, components or steps.

We claim:

1. A wheelhouse cladding step for providing access to the roof of the vehicle, the wheelhouse cladding step comprising:
   a step for coupling to a wheelhouse of the vehicle, the step having a first side including a stepping surface and a second side including a finish surface, the step movable between a first closed position in which the stepping surface is received in a wheelhouse recess of the vehicle and the second finish side closes the wheelhouse recess and a second deployed position in which the stepping surface of the first side is substantially aligned horizontal with the ground and the second finish side substantially faces the ground;
   a latching mechanism for selectively latching the step to the vehicle when the step is in the first closed position and for releasing the step to be moved to the second deployed position; and
   a pair of hinge mechanisms mountable at respective opposing sides of the wheelhouse, each hinge mechanism including an extension member connected to the step, a link member having a first end coupled to the extension member and a second end coupled to a post, and a spring mechanism having an input end coupled to a point between the first and second ends of the link member.

2. The wheelhouse cladding step of claim 1 wherein the latching mechanism includes a first portion coupled to the step and a second portion to be coupled to the vehicle.

3. The wheelhouse cladding step of claim 2 wherein the first portion of the latching mechanism is a male member coupled to a central portion of the step and wherein the second portion is a recess to be located on a panel of the vehicle and selectively couples with the male member.

4. The wheelhouse cladding step of claim 1 wherein the stepping surface includes a non-slip material.

5. The wheelhouse cladding step of claim 1 wherein the finish surface of the step is selected to match a surface of the vehicle to make the wheelhouse cladding step appear to be an integral part of the vehicle.

6. The wheelhouse cladding step of claim 1 wherein the step has a preselected shape chosen to match at least a portion of the shape of the wheelhouse of the vehicle.

7. The wheelhouse cladding step of claim 6 wherein the step has a generally curvilinear shape.

8. The wheelhouse cladding step of claim 6 wherein the step has a generally curvilinear shape including a first end and a second end and wherein the wheelhouse cladding step further comprises a first hinge for coupling the step to the vehicle, the first hinge located proximal the first end of the step; and a second hinge for coupling the step to the vehicle, the second hinge located proximal the second end of the step.

9. The wheelhouse cladding step of claim 1, wherein the extension members of the hinge mechanisms are curved.

10. A wheelhouse cladding step assembly for providing a step proximal a wheelhouse of the vehicle for providing improved access to the roof of the vehicle, the wheelhouse cladding step assembly comprising:
a step having a curved shape matching the shape of the wheelhouse of the vehicle, the step having a first side including a non-slip surface and a second side including a finish surface designed to match the finishes of the vehicle, the step movable between a first closed position in which second side of the step covers the wheelhouse and a second deployed position, the step having a first end and a second end;
a latching mechanism for selectively latching the step to the vehicle when the step is in the first closed position and for releasing the step to be moved to the second deployed position; and
a pair of hinge mechanisms mountable at respective opposing sides of the wheelhouse, each hinge mechanism including an extension member connected to the step, a link member having a first end coupled to the extension member and a second end coupled to a post, and a spring mechanism having an input end coupled to a point between the first and second ends of the link member.

11. The wheelhouse cladding step assembly of claim 10 wherein the latching mechanism includes a first portion coupled to the step and a second portion to be coupled to the vehicle.

12. The wheelhouse cladding step assembly of claim 11 wherein the first portion of the latching mechanism is a male member coupled to a central portion of the step and wherein the second portion is a recess to be selectively coupled with the male member.

13. The wheelhouse cladding step of claim 10 wherein the finish surface of the step is selected to match a trim surface of the vehicle to make the wheelhouse cladding step appear to be an integral part of the vehicle.

14. The wheelhouse cladding step assembly of claim 10, wherein the extension members of the hinge mechanisms are curved.

15. A wheeled vehicle comprising:
a roof covering at least a portion of an occupant compartment;
a side extending down from the roof, the side including a wheelhouse proximal a wheel of the vehicle and including a trim member located proximal the wheelhouse; and
a wheelhouse cladding step assembly for providing a step proximal the wheelhouse of the vehicle for providing improved access to the roof of the vehicle, the wheelhouse cladding step assembly comprising:
a step having a shape matching the shape of the wheelhouse of the vehicle, the step having a first side including a non-slip surface and a second side including a finish surface designed to match the trim member of the vehicle, the step movable between a first closed position in which the finish surface of the second side of the step covers the wheelhouse and a second deployed position; and
a latching mechanism for selectively latching the step to the vehicle when the step is in the first closed position and for releasing the step to be moved to the second deployed position; and
a pair of hinge mechanisms mountable at respective opposing sides of the wheelhouse, each hinge mechanism including an extension member connected to the step, a link member having a first end coupled to the extension member and a second end coupled to a post, and a spring mechanism having an input end coupled to a point between the first and second ends of the link member.

16. The wheeled vehicle of claim 15 wherein the latching mechanism of the wheelhouse cladding step assembly includes a first portion coupled to the step and a second portion coupled to the side of the vehicle proximal the wheelhouse.

17. The wheeled vehicle of claim 15 wherein the first portion of the latching mechanism is a male member coupled to a central portion of the step and wherein the second portion is a recess to be selectively coupled with the male member.

18. The wheeled vehicle of claim 15 wherein the side of the vehicle includes a wheelhouse recess for receiving at least a portion of the step when the step is in the closed position.

19. The wheeled vehicle of claim 15 wherein the spring mechanism for providing is arranged to provide a biasing force against the movement of the step when the step is in the first closed position.

20. The wheeled vehicle of claim 15 wherein the spring mechanism is arranged to provide a biasing force against the movement of the step when the step is in the second deployed position.

* * * * *